United States Patent
Chen

(10) Patent No.: US 7,949,137 B2
(45) Date of Patent: May 24, 2011

(54) VIRTUAL DISK MANAGEMENT METHODS

(75) Inventor: Rui-Hwa Chen, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 957 days.

(21) Appl. No.: 11/777,322

(22) Filed: Jul. 13, 2007

(65) Prior Publication Data

US 2008/0065909 A1 Mar. 13, 2008

Related U.S. Application Data

(60) Provisional application No. 60/824,781, filed on Sep. 7, 2006.

(51) Int. Cl.
*H04L 9/08* (2006.01)

(52) U.S. Cl. ........ 380/281; 380/284; 713/182; 713/193; 705/56; 726/6; 726/18; 726/27

(58) Field of Classification Search .................. None
See application file for complete search history.

(56) References Cited

U.S. PATENT DOCUMENTS

| | | | | |
|---|---|---|---|---|
| 7,043,637 | B2 * | 5/2006 | Bolosky et al. | 713/171 |
| 7,373,451 | B2 * | 5/2008 | Lam et al. | 711/6 |
| 2007/0078866 | A1 * | 4/2007 | Takashima | 707/100 |
| 2007/0110044 | A1 * | 5/2007 | Barnes et al. | 370/360 |
| 2007/0143459 | A1 * | 6/2007 | Batteram et al. | 709/223 |

* cited by examiner

*Primary Examiner* — Kaveh Abrishamkar
(74) *Attorney, Agent, or Firm* — Thomas Kayden

(57) ABSTRACT

Virtual disks management methods and systems. First, a file space is set and a first password is set. A first device code is acquired. The file space is encrypted according to the first password and the first device code to obtain an encrypted file. Thereafter, a designation of the encrypted file is received. A second password is received, and a second device code is acquired. It is determined whether the second password conforms to the first password, and whether the second device code conforms to the first device code. If so, the encrypted file is mounted as a virtual disk.

17 Claims, 5 Drawing Sheets

VIRTUAL DISK MANAGEMENT METHODS

BACKGROUND OF THE INVENTION

1. Field of the Invention

The invention relates generally to virtual disk management methods, and, more particularly, to virtual disk management methods with authority control mechanisms where specific users/groups can mount encrypted devices on specific hosts.

2. Description of the Related Art

In computer systems, some applications such as EDA (Encrypted Device Application) can encrypt specific files as encrypted files, and mount the encrypted files as virtual disks. The virtual disks may use various encryption algorithms to keep user information safe from attacks by viruses and hackers.

Conventionally, EDA accepts a password from user and encrypts a file accordingly. During mounting of encrypted files, EDA also determines whether a password is correct, and mounts an encrypted file if the password is correct. FIG. 1 is a flowchart of a conventional method for creating encrypted files by EDA. In step S110, EDA 10 generates a request asking for a file size of a virtual disk. In step S120, user 20 sets the file size used for the virtual disk to EDA 10. In step S130, EDA 10 generates a request asking for a password corresponding to the virtual disk. In step S140, user 20 sets the password for the virtual disk to EDA 10. In step S150, EDA 10 encrypts a file space with the file size according to the password to create an encrypted file 30. FIG. 2 is a flowchart of a conventional method for mounting encrypted files as virtual disks by EDA. In step S210, EDA 10 generates a request asking for a designation of a specific encrypted file to be mounted. In step S220, user 20 selects an encrypted file 30. In step S230, EDA 10 checks existence of the designated encrypted file 30. If the encrypted file 30 does not exist (No in step S240), the procedure is complete. If the encrypted file 30 exists (Yes in step S240), in step S250, EDA 10 generates a request asking for a password corresponding to the encrypted file 30. In step S260, user 20 enters the password to EDA 10. In step S270, EDA 10 determines whether the password is correct. If not (No in step S270), the procedure is complete. If so (Yes in step S270), in step S280, the encrypted file 30 is mounted as a virtual disk 40.

As described, since the file is encrypted according to the password set by user, the password may be easily ascertained, and the encrypted file may be used by others. Additionally, no authority control mechanism is provided by conventional virtual disks management mechanisms, thus lacking access flexibility for multiple users. Further, since conventional virtual disk management mechanisms cannot recognize the host of the encrypted files, the encrypted files may be copied onto other hosts and used thereto.

BRIEF SUMMARY OF THE INVENTION

Virtual disk management methods and systems are provided.

In an embodiment of a virtual disk management method, a file space is set and a first password is set. A first device code is acquired. The file space is encrypted according to the first password and the first device code to obtain an encrypted file. Thereafter, a designation of the encrypted file is received. A second password is received, and a second device code is acquired. It is determined whether the second password conforms to the first password, and whether the second device code conforms to the first device code. If so, the encrypted file is mounted as a virtual disk.

In an embodiment of a virtual disk management method, a file space is set and a first password is set. A first device code is acquired. The first device code is encrypted to obtain a disk root key. The first password is encrypted according to the disk root key to obtain a disk encryption key. The file space is encrypted according to the disk encryption key to obtain an encrypted file. The encrypted file is used for a virtual disk.

In an embodiment of a virtual disk management method, a designation of an encrypted file is received, and a second password is set. A second device code is acquired. A disk root key corresponding to the encrypted file is decrypted to obtain a first device code. It is determined whether the second device code conforms to the first device code. A disk encryption key corresponding to the encrypted file is decrypted according to the disk root key to obtain a first password. It is determined whether the second password conforms to the first password. If the second device code conforms to the first device code, and the second password conforms to the first password, the encrypted file is mounted as a virtual disk.

An embodiment of a virtual disk management system comprises a storage device and an encryption device application. The encryption device application receives a designation of an encrypted file in the storage device, and a second password. The encryption device application acquires a second device code. The encryption device application decrypts a disk root key corresponding to the encrypted file to obtain a first device code. The encryption device application determines whether the second device code conforms to the first device code. The encryption device application decrypts a disk encryption key corresponding to the encrypted file according to the disk root key to obtain a first password. The encryption device application determines whether the second password conforms to the first password. If the second device code conforms to the first device code, and the second password conforms to the first password, the encryption device application mounts the encrypted file as a virtual disk.

Virtual disk management methods and systems may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Virtual disk management methods and systems are provided.

Figure 1:
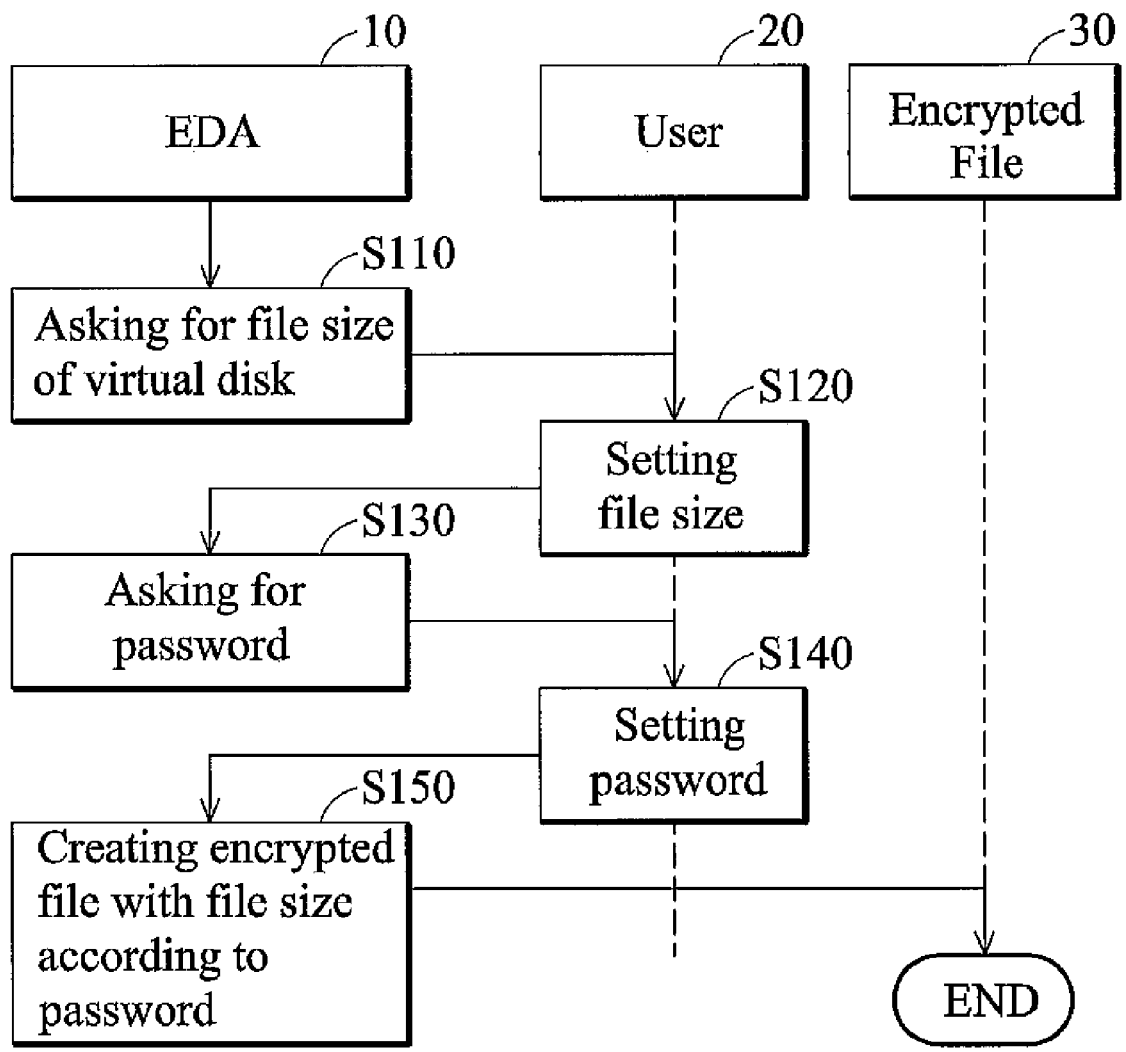
FIG. 1 is a flowchart of a conventional method for creating encrypted files by EDA.
Figure 2:
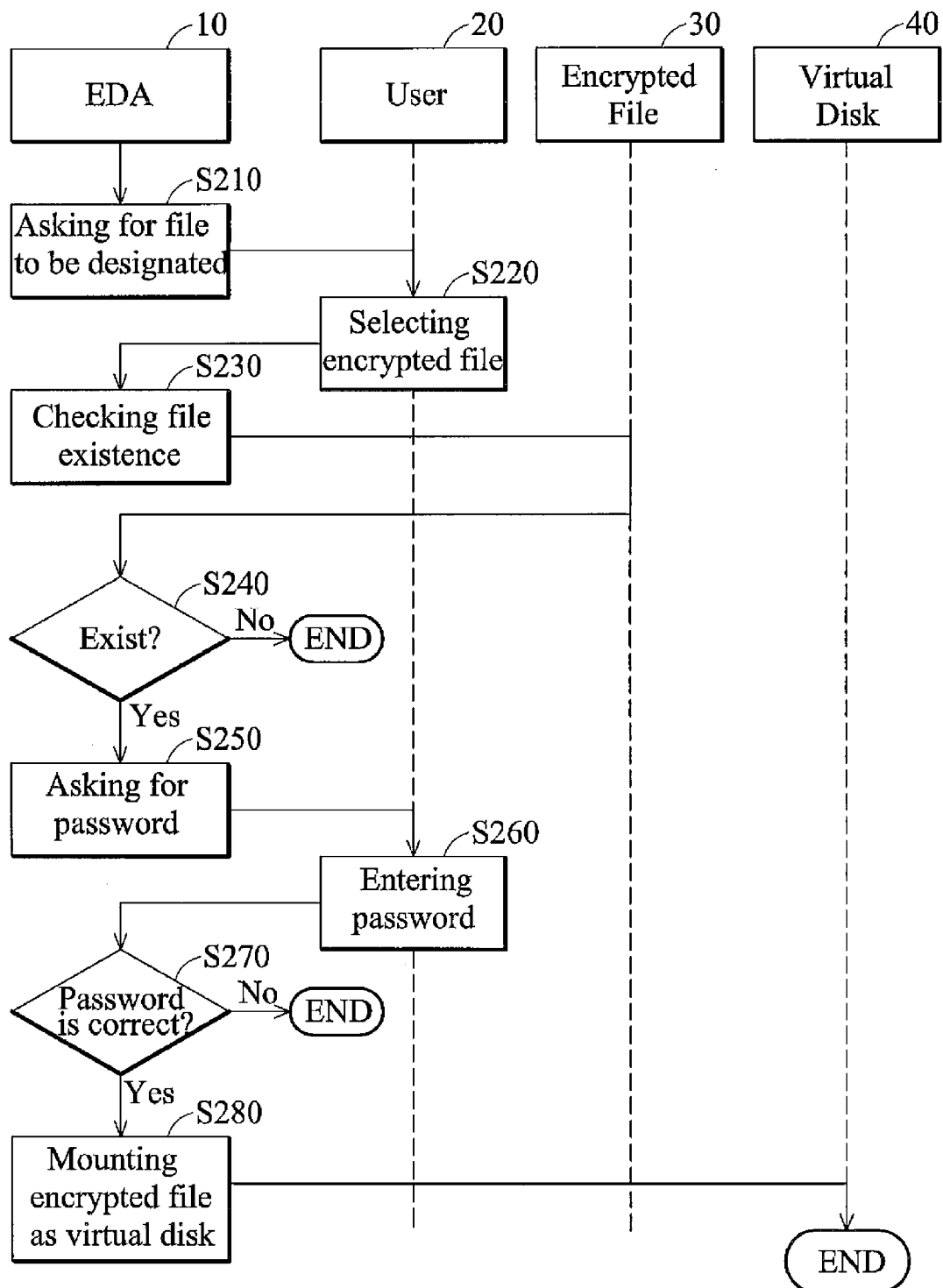
FIG. 2 is a flowchart of a conventional method for mounting encrypted files as virtual disks by EDA.
Figure 3:
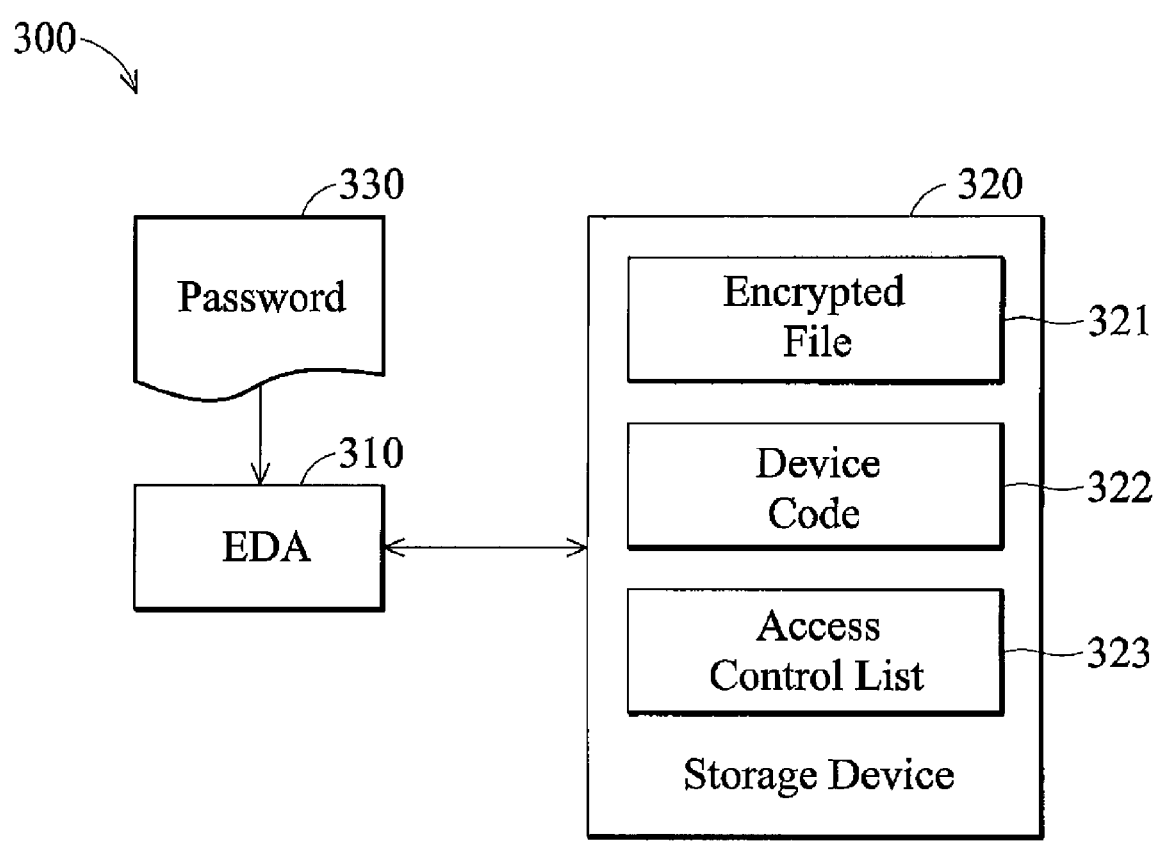
FIG. 3 is a schematic diagram illustrating an embodiment of a virtual disk management system.

FIG. 3 illustrates an embodiment of a virtual disk management system.

The virtual disk management system 300 comprises an encryption device application 310 and a storage device 320.

The encryption device application 310 can receive a password 330 from an input device, and encrypt a file space in the storage device 320 according to the virtual disk management methods to obtain an encrypted file 321. The storage device 320 has a device code 322. The device code can be used to identify the storage device 320. The device code may be a code set by users or an identification code of a component in the storage device 320. For example, the device code 322 may be a UUID (Universal Unique Identifier) of a hard disk, a UUID of a CPU (Central Processing Unit) of the storage device 320, or an unique code of any component within the computer system. Additionally, the storage device 320 further comprises an access control list 323 defining access authorities towards the virtual disk corresponding to the encrypted file 321 for respective users/groups. The access authorities comprise authorities of disk read, disk write, disk execution, and modification for a disk specific key corresponding to the access control list 323. The disk specific key is discussed later. It is understood that, in some embodiments, the encrypted access control list 323 can be stored in the encrypted file 321.

Figure 4:
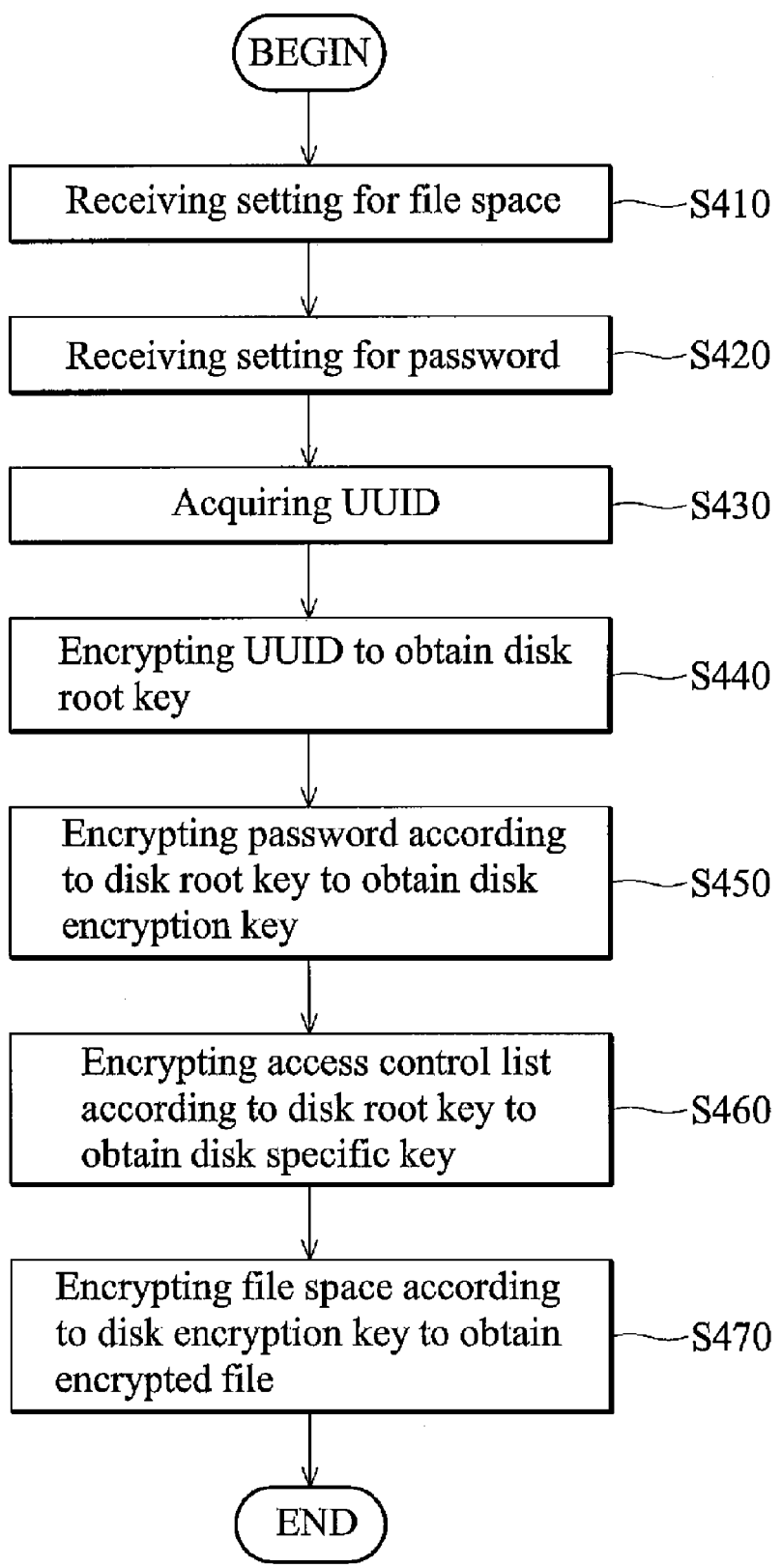
FIG. 4 is a flowchart of an embodiment of a virtual disk management method for creating encrypted files.

FIG. 4 is a flowchart of an embodiment of a virtual disk management method for creating encrypted files. In this embodiment, UUID is employed as the device code for explanation, but is not limited thereto.

In step S410, a setting of a file size of a file space is received, and in step S420, a setting of a password is received. Similarly, the encryption device application can generate requests to users for the file size and the password. In step S430, a UUID is acquired. It is noted that the UUID may correspond to the storage device or processing unit. In step S440, the UUID is encrypted to obtain a disk rook key (DRK). It is understood that the disk rook key is generated using an asymmetric algorithm such as RSA, or a symmetric algorithm such as AES, DES and Blowfish. In some embodiments, the UUID is encrypted using RSA algorithm with a public key corresponding to the encryption device application to obtain the disk root key. In some embodiments, the UUID is encrypted using AES algorithm with a secret key corresponding to the encryption device application to obtain the disk root key. In step S450, the password is encrypted according to the disk root key to obtain a disk encryption key (DEK). In step S460, the access control list is encrypted according to the disk root key to obtain a disk specific key (DSK). In step S470, the file space is encrypted according to the disk encryption key to obtain an encrypted file. It is understood that the disk specific key can be stored in the encrypted file.

Figure 5:
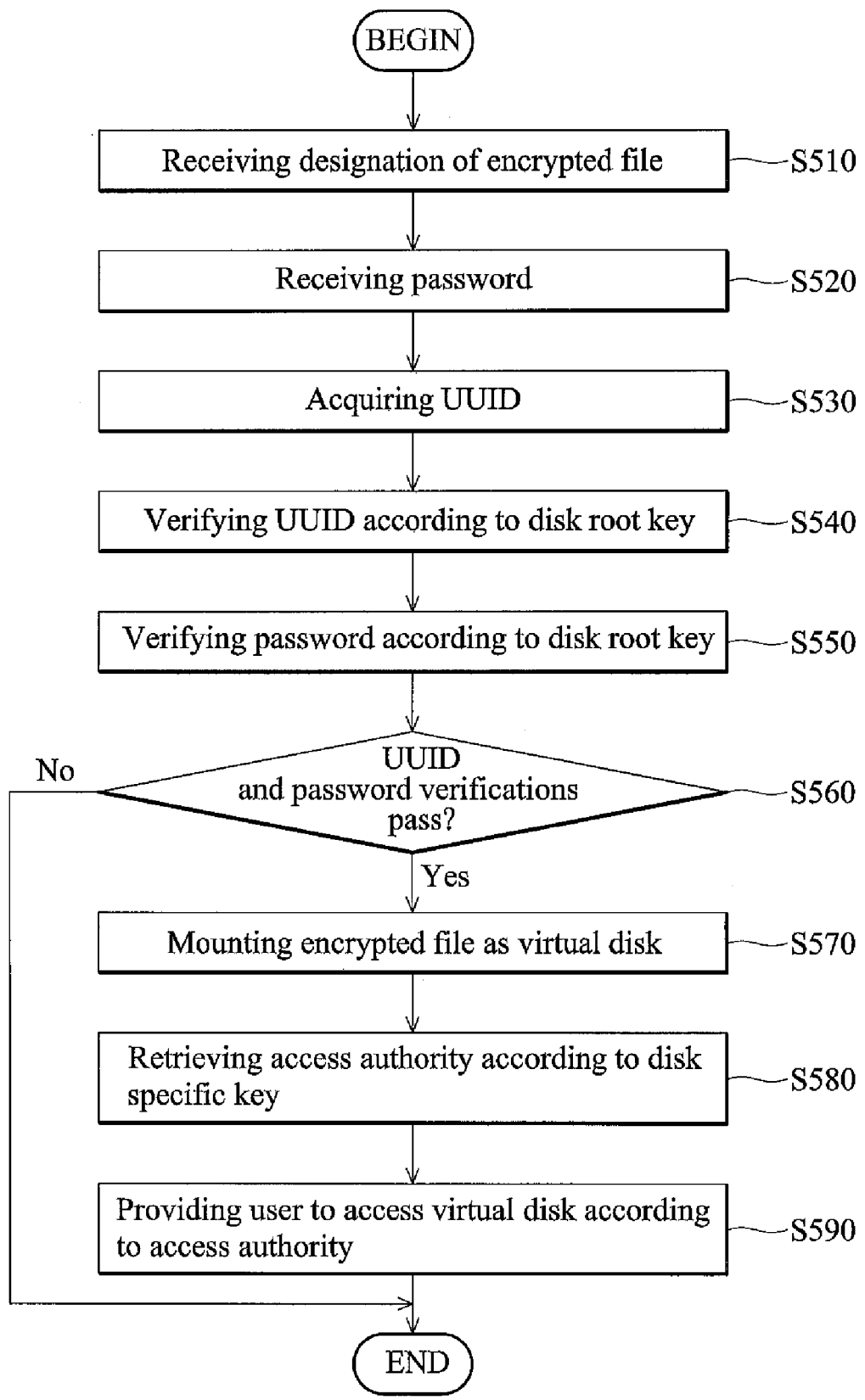
FIG. 5 is a flowchart of an embodiment of a virtual disk management method for mounting encrypted files as virtual disks.

FIG. 5 is a flowchart of an embodiment of a virtual disk management method for mounting encrypted files as virtual disks. Similarly, in this embodiment, UUID is employed as the device code for explanation, but is not limited thereto.

In step S510, a designation of an encrypted file is received, and in step S520, a password is received. In step S530, a UUID of a storage device or a processing unit of a host storing the encrypted file is acquired. In step S540, the UUID is verified according to a disk root key corresponding to the encrypted file. In this step, the disk root key is decrypted to obtain an original UUID. It is determined whether the acquired UUID conforms to the original UUID. As described, the disk rook key may be generated using an asymmetric algorithm or a symmetric algorithm. In some embodiments, the disk root key is decrypted using RSA algorithm with a private key corresponding to the encryption device application to obtain the original UUID. In some embodiments, the disk root key is decrypted using AES algorithm with a secret key corresponding to the encryption device application to obtain the original UUID. In step S550, the password is verified. In this step, a disk encryption key corresponding to the encrypted file is decrypted according to the disk root key to obtain an original password. It is determined whether the received password conforms to the original password. If the UUID verification or the password verification fails (the acquired UUID does not conform to the original UUID or the received password does not conform to the original password) (No in step S560), the procedure is complete. If the UUID verification and the password verification pass (the acquired UUID conforms to the original UUID and the received password conforms to the original password) (Yes in step S560), in step S570, the encrypted file is mounted as a virtual disk.

It is understood that since a disk with excessively large volumes may increase maintenance and management difficulties of virtual disks, in some embodiments, the encrypted file may be constructed into a RAID (Redundant Array of Independent Disks) system. For example, in the RAID 0 architecture, the encrypted file is divided into several strips and stored in different disks. In the RAID 1 architecture, the encrypted file is duplicated as several copies and stored in different disks. In some embodiments, respective disks in the RAID system can generate corresponding strips or copies according to the method in FIG. 4. If respective disks are constructed by a common user and in the same storage device, respective disks may have a same disk encryption key. Additionally, respective disks may have different disk specific key based on various requirements. Further, respective disks in the RAID system may be mounted as virtual disks according to the method in FIG. 5. During disk mounting, all disks of the RAID system can be completely mounted if the disk rook key and all disk specific keys of respective disks are correct.

In the virtual disk management method and systems, specific users/groups can mount encrypted devices on specific hosts. Additionally, the authority control mechanisms of virtual disk management are improved, increasing access flexibility for virtual disk users.

Virtual disks management methods and systems, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those skilled in the technology can still make various alterations and modifications without departing from the scope and spirit of this invention. Therefore, the scope of the present invention shall be defined and protected by the following claims and their equivalents.

What is claimed is:

1. A virtual disk management method in a system comprising a processing unit, comprising:

setting a file space;

setting a first password;
acquiring a first device code;
encrypting the first device code to obtain a disk root key by the processing unit;
encrypting the first password according to the disk root key to obtain a disk encryption key by the processing unit; and
encrypting the file space according to the disk encryption key to obtain an encrypted file by the processing unit, where the encrypted file is used for a virtual disk.

2. The method of claim 1 further comprising:
receiving a designation of the encrypted file;
receiving a second password;
acquiring a second device code;
decrypting the disk root key to obtain the first device code;
determining whether the second device code conforms to the first device code;
decrypting the disk encryption key according to the disk root key to obtain the first password;
determining whether the second password conforms to the first password; and
if the second device code conforms to the first device code, and the second password conforms to the first password, mounting the encrypted file as the virtual disk.

3. The method of claim 2 further comprising:
obtaining an access control list; and
encrypting the access control list according to the disk root key to obtain a disk specific key.

4. The method of claim 3 further comprising:
obtaining the disk specific key;
decrypting the disk specific key according to the disk root key to obtain the access control list;
retrieving an access authority towards the virtual disk for a specific user according to the access control list; and
providing the specific user to access the virtual disk according to the access authority.

5. The method of claim 1 further comprising constructing the encrypted file as a RAID system, where respective strips in the RAID system correspond to various disk specific keys or a common disk specific key.

6. The method of claim 1 further comprising obtaining the first device code of a storage device or a processing unit.

7. The method of claim 1 wherein the first device code comprises a UUID of the storage device or a processing unit.

8. A virtual disk management method in a system comprising a processing unit, comprising:
setting a file space;
setting a first password;
acquiring a first device code;
encrypting the file space according to the first password and the first device code to obtain an encrypted file by the processing unit, wherein the first device code is encrypted to obtain a disk root key, the first password is encrypted according to the disk root key to obtain a disk encryption key, and the file space is encrypted according to the disk encryption key to obtain the encrypted file;
receiving a designation of the encrypted file;
receiving a second password;
acquiring a second device code;
determining whether the second password conforms to the first password;
determining whether the second device code conforms to the first device code;
if the second device code conforms to the first device code, and the second password conforms to the first password, mounting the encrypted file as a virtual disk.

9. The method of claim 8 further comprising:
decrypting the disk root key to obtain the first device code; and
decrypting the disk encryption key according to the disk root key to obtain the first password.

10. The method of claim 8 further comprising:
obtaining an access control list; and
encrypting the access control list according to the disk root key to obtain a disk specific key.

11. The method of claim 10 further comprising:
obtaining the disk specific key;
decrypting the disk specific key according to the disk root key to obtain the access control list;
retrieving an access authority towards the virtual disk for a specific user according to the access control list; and
providing the specific user to access the virtual disk according to the access authority.

12. The method of claim 11 further comprising obtaining a UUID of a storage device or a processing unit as the first device code.

13. A virtual disk management method in a system comprising a processing unit, comprising:
receiving a designation of an encrypted file;
receiving a second password;
acquiring a second device code;
decrypting a disk root key corresponding to the encrypted file to obtain a first device code by the processing unit;
determining whether the second device code conforms to the first device code;
decrypting a disk encryption key corresponding to the encrypted file according to the disk root key to obtain a first password by the processing unit;
determining whether the second password conforms to the first password; and
if the second device code conforms to the first device code, and the second password conforms to the first password, mounting the encrypted file as a virtual disk,
wherein the first device code is encrypted to obtain a disk root key, the first password is encrypted according to the disk root key to obtain a disk encryption key, and the file space is encrypted according to the disk encryption key to obtain the encrypted file.

14. The method of claim 13 further comprising:
obtaining a disk specific key corresponding to the encrypted file;
decrypting the disk specific key according to the disk root key to obtain an access control list;
retrieving an access authority towards the virtual disk for a specific user according to the access control list; and
providing the specific user to access the virtual disk according to the access authority.

15. The method of claim 14 further comprising encrypting the access control list according to the disk root key to obtain the disk specific key.

16. The method of claim 13 further comprising acquiring the second device code of a storage device or a processing unit.

17. The method of claim 16 wherein the second device code comprises a UUID of the storage device or the processing unit.

* * * * *